Feb. 2, 1926.  
W. J. HAGMAN  
AXLE CUTTING OFF AND CENTERING MACHINE  
Filed June 9, 1922  
1,571,331  
3 Sheets-Sheet 1
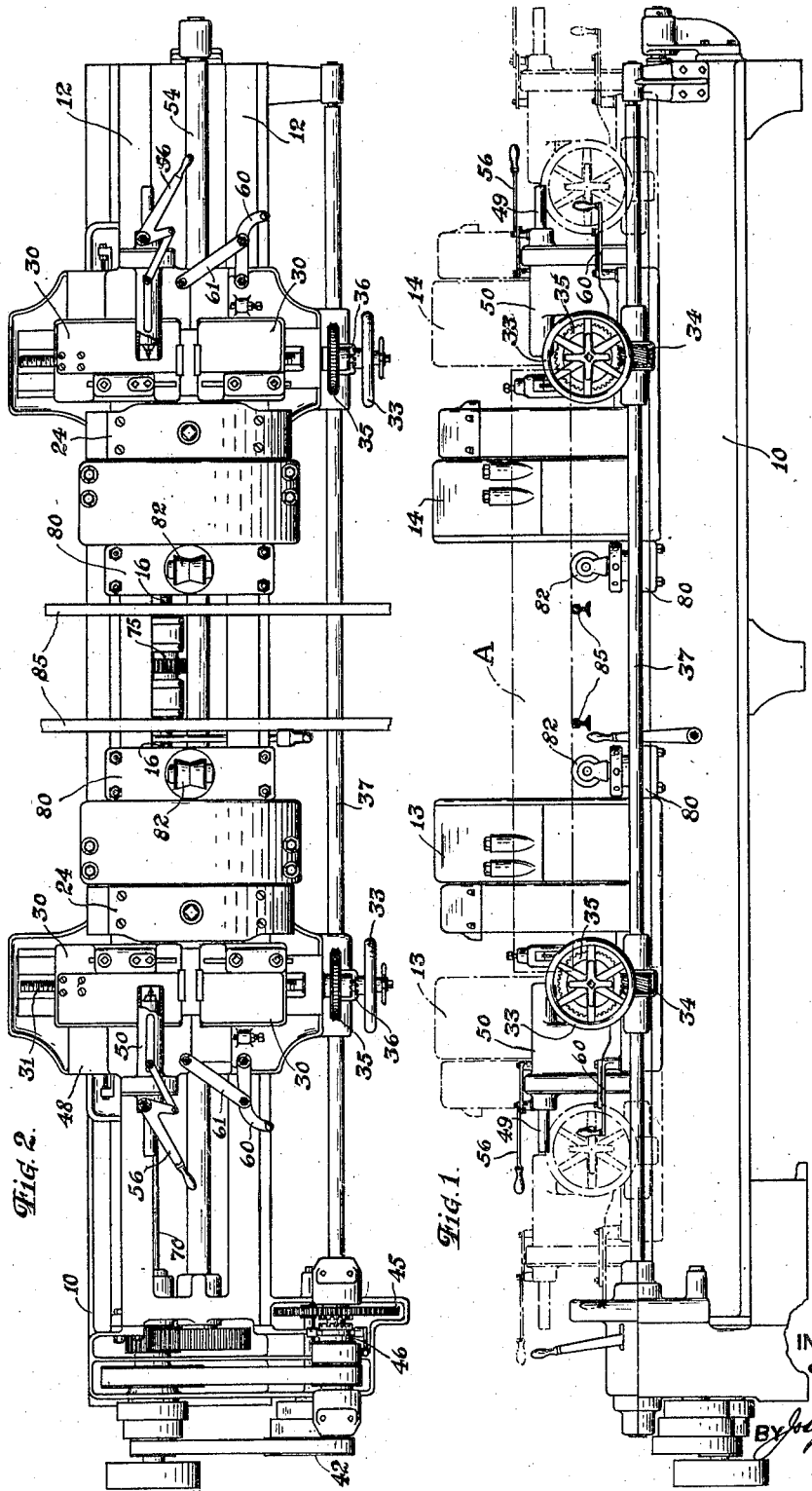
INVENTOR  
W. J. Hagman  
BY  
ATTORNEY Feb. 2, 1926.  
W. J. HAGMAN  
1,571,331  
AXLE CUTTING OFF AND CENTERING MACHINE  
Filed June 9, 1922  
3 Sheets-Sheet 2
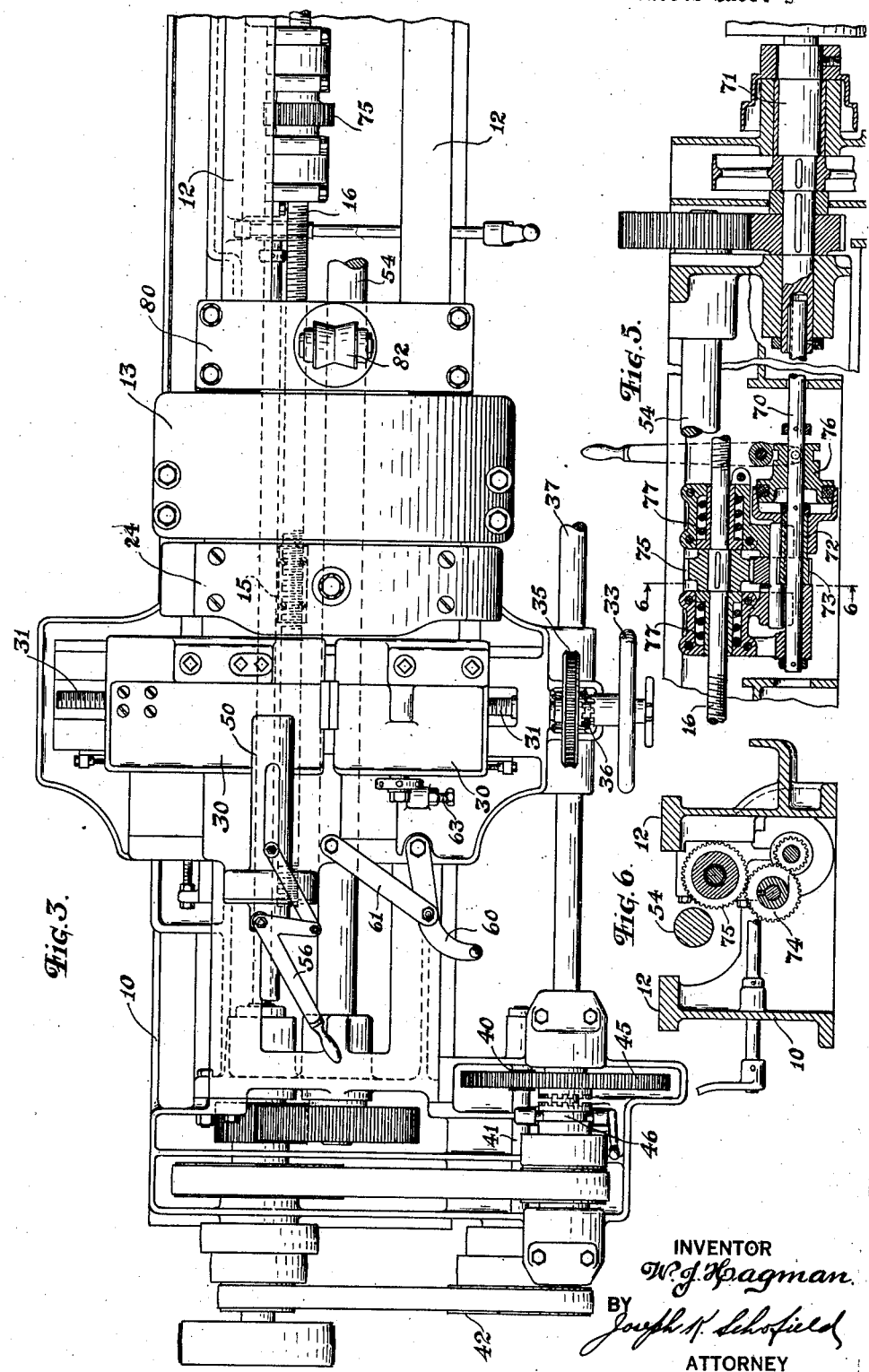
INVENTOR  
W. J. Hagman.  
BY  
Joseph K. Schofield  
ATTORNEY

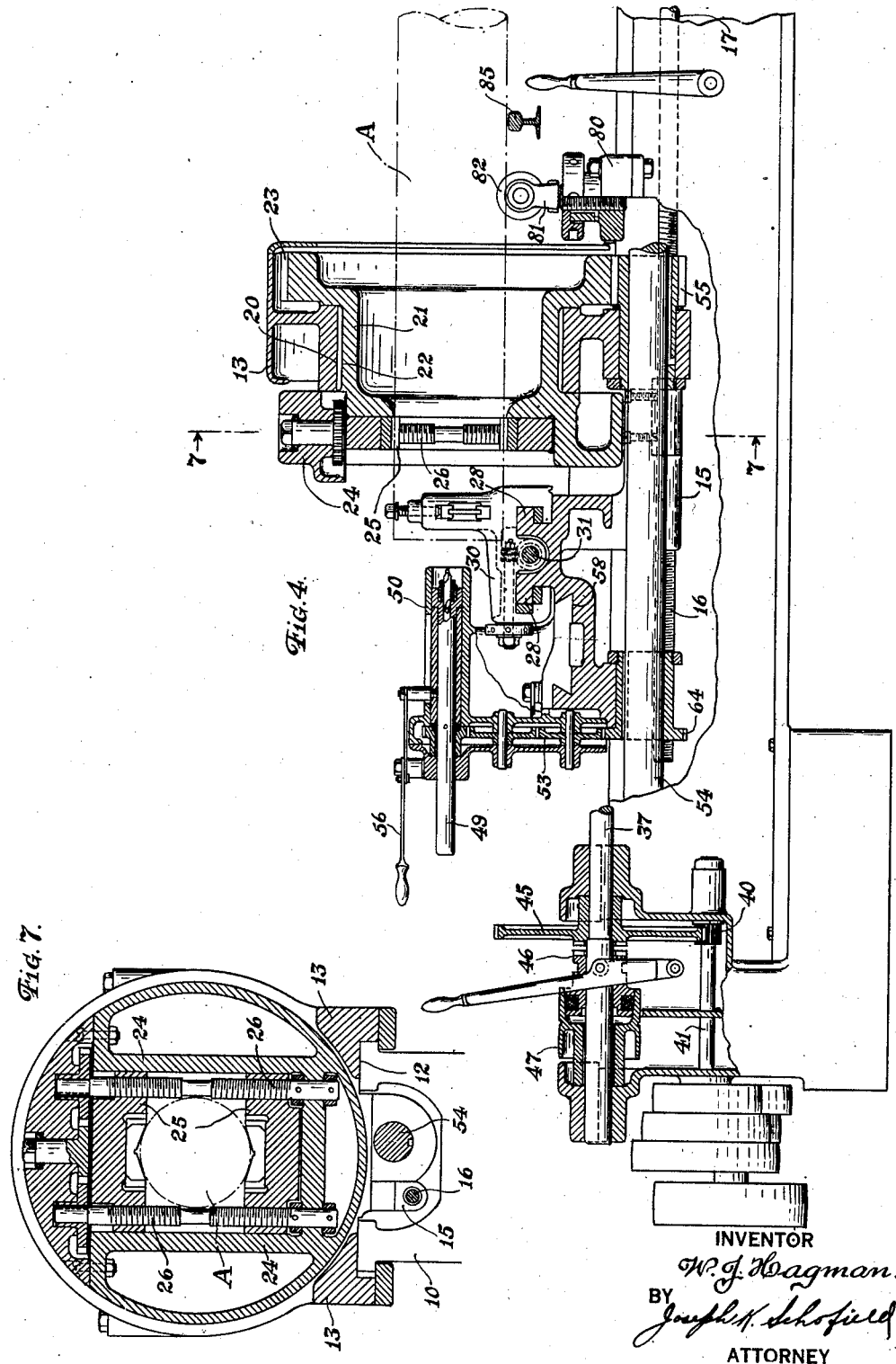

Patented Feb. 2, 1926.

1,571,331

UNITED STATES PATENT OFFICE.

WILLIAM J. HAGMAN, OF PHILADELPHIA, PENNSYLVANIA, ASSIGNOR TO NILES-BEMENT-POND COMPANY, OF NEW YORK, N. Y., A CORPORATION OF NEW JERSEY.

AXLE CUTTING-OFF AND CENTERING MACHINE.

Application filed June 9, 1922. Serial No. 567,057.

*To all whom it may concern:*

Be it known that I, WILLIAM J. HAGMAN, a citizen of the United States, residing at Philadelphia, in the county of Philadelphia and State of Pennsylvania, have invented certain new and useful Improvements in Axle Cutting-Off and Centering Machines, of which the following is a specification.

This invention relates to a metal cutting machine and in particular to a machine for simultaneously cutting off the ends of a work blank and also, if desired, centering the same.

An object of the present invention is to improve the construction and operation of cutting-off machines usually employed for heavy work such as axle forgings, the mechanism being arranged so that the blanks may be more expeditiously and conveniently placed in operative position and removed therefrom.

One feature which enables me to accomplish the above named object is that the machine is arranged so that a work blank may be rolled into position above the base of the machine while heads in which work rotating chucks are mounted are separated, after which the heads may be advanced simultaneously toward each other and the chucks engaged with the blank to support and rotate it.

Another feature which is advantageous is that on the heads supporting the work rotating chucks, cutting tools are directly mounted so that these cutting tools always operate in exactly predetermined relationship to the chucks.

Another object of the invention is to improve the driving mechanism for rotating the chucks and operating the metal cutting tools. Preferably, also these driving means are used to simultaneously move the chuck supporting heads toward or from each other.

Another object of the invention is to provide adjustable means to limit the approaching movement of the heads so that the chucks and cutting tools may be repeatedly brought to the same operative position relative to a blank. These limiting means preferably may be in the form of stops adapted to be adjustably clamped along the base so that work blanks of different lengths may be operated on after these stops have been adjusted to predetermined positions for the particular length of work blank.

Another object of the invention is to provide special slides for mounting the centering tools so that the slides may be moved into and out of operative positions. Also it is an object to provide opposed cutting off tools on the heads at opposite ends of the machine, each cutting off tool being mounted on a separate carriage or slide.

With these and other objects in view, my invention consists in the features of construction and operation set forth in the following specification and illustrated in the accompanying drawings.

In the accompanying drawings annexed hereto and forming a part of this specification, I have shown my invention embodied in an axle cutting-off and centering machine, but it will be understood that the invention can be otherwise embodied and that the drawings are not to be construed as defining or limiting the scope of the invention, the claims appended to this specification being relied upon for that purpose.

In the drawings:

Figure 1 is a front elevation of the complete machine, both the operative and loading positions of the heads being shown.

Fig. 2 is a plan view of the complete machine, the heads being shown in their operative positions.

Fig. 3 is a plan view of the driving end of the machine on an enlarged scale.

Fig. 4 is a front view in section taken centrally of the machine.

Fig. 5 is a vertical sectional view taken from the rear showing the head traversing mechanism.

Fig. 6 is a transverse view of the parts shown in Fig. 5, and

Fig. 7 is a sectional view taken on line 7—7 of Fig. 4.

In the above mentioned drawings, I have shown but one modification of the invention which is now deemed preferable, but it is to be understood that changes and modifications may be made within the scope of the appended claims without departing from the spirit of the invention.

Briefly, my invention in its broadest aspect comprises the following principal parts: first, a base; second, a pair of heads mounted for longitudinal movement thereon; third, traversing means whereby the heads may be simultaneously moved toward or from each other; fourth, work supporting and rotating means on each of the heads; fifth, metal cutting tools mounted on the heads; sixth, driving means for rotating the chucks and operating the metal cutting tools; and seventh, other driving means preferably frictionally controlled for advancing the heads toward each other to a predetermined limited position.

Previously in machines of the type used for similar operations on heavy forged blanks, it has been the custom to insert the work blank into operative position by sliding it axially or longitudinally of the machine and passing the blank manually through both of the work supporting and rotating chucks. Also in previous machines the chucks and the heads in which they are mounted are clamped in adjusted position on the base and are not moved toward and from each other during the normal operation of the machine.

This previously used mechanism and its method of operation had the disadvantage of delaying production by requiring a slow and awkward operation for mounting and dismounting the work blanks. In the present construction the heads are provided with means to quickly and simultaneously move them toward and from each other so that work blanks may be supported in approximate position for operation thereon while the heads are widely separated. Then, as soon as a work blank is in this position to which it may be moved by rolling upon transverse tracks or by any other means, the heads are advanced toward each other and the blank supported and rotated by means of the chucks provided on the heads.

Referring more in detail to the figures of the drawings, I show a machine made in accordance with the present invention adapted for operating upon axles used for railroad cars. This machine comprises a base 10 having its upper surface provided with guideways 12 extending throughout its entire length. On these guideways 12 are mounted two heads 13 and 14 oppositely disposed and adapted to be moved to any desired positions along the base 10. Each of these heads 13 and 14 has a depending projection forming a nut 15 engaged by screw threads 16 formed on a rotatably mounted rod or shaft 17 extending horizontally and longitudinally along substantially the entire length of the base 10. The screw threads 16 engaged by each of these heads 13 and 14 are respectively right and left hand so that rotation of the threaded rod or shaft 17 in one direction will advance the two heads toward each other and rotation of the shaft 17 in the opposite direction will move the heads 13 and 14 away from each other. Means for rotating this threaded rod or shaft 17 will presently be described.

As each of the heads 13 and 14 is similar to the other, a description of the mechanism on one will suffice for both. It is to be understood, however, that the position of the mechanisms on each of the heads 13 and 14 is oppositely disposed. Each of these heads is provided with a large cylindrical bearing surface 20, the axis of which is in alignment with the longitudinal axes of the heads and parallel to the ways 12 on which the heads 13 and 14 slide. Within this bearing 20 rotates a work supporting and rotating member 21. This, as will be seen by the longitudinal sectional view in Fig. 4, is provided with a central journal portion 22 engaging the bearing 20 in the head 13 and, at one side thereof, the member 21 is provided with gear teeth 23 adapted to mesh with a gear 55 splined to a longitudinally extending shaft 54. On the opposite side of the journaled portion of member 21 is a chuck 24. This is provided with opposite V-shaped jaws 25 which may be simultaneously forced toward each other by rotation of the threaded rods 26 shown in Figs. 4 and 7. As indicated the threads on these rods or bars are oppositely disposed so that rotation of the rods forces the jaws 25 toward or from each other and also maintains the jaws 25 symmetrically disposed in all adjusted positions to support and rotate blanks of different diameters about the same axis.

Also mounted on these heads 13 and 14 are transverse horizontal ways 28 upon which oppositely disposed tool carriages 30 may be slidably mounted. Preferably, I provide two of these carriages, one in front and the other in rear of the work blank and movable oppositely by means presently described. Each of these carriages carries a metal cutting tool. These tool carriages 30 are operated to engage the work and are fed transversely directly toward the axis of rotation of the blank by means of a transverse feed screw 31 engaging correspondingly threaded nuts provided in these two carriages. This feed screw 31 may be rotated by a hand wheel 33 or by power means by the worm 34 and worm wheel 35, the worm 34 being fixed to a driving shaft 37. This driving means may be engaged by moving a clutch 36 to operative position. The mechanism for driving the shaft 37 by means of which the worm wheel 35 is rotated is designed to rotate the shaft 37 in opposite directions and at greatly increased speed while moving the tools backward when compared to the speed during the operation of feeding the tools into the work.

This mechanism comprises a pinion 40 on a shaft 41 adapted to be rotated by a pulley 42 belt driven as shown from the main drive shaft. The pinion 40 is in mesh with a large gear 45 rotatably mounted on the shaft 37. The gear 45 may be placed in driving engagement with shaft 37 by operation of a clutch 46 splined to shaft 37. This mechanism is designed to rotate the shaft 37 at a low speed to advance the tool heads 30 toward the axis of rotation of the work. To rotate the shaft 37 at a high rate of speed for withdrawing the tools from the work, I provide a pulley 47 belt driven from the main driving shaft and having a conical surface adapted to contact with a part of the clutch 46 when it is moved to the left as seen in Fig. 4.

Also mounted on each of these heads 13 and 14 but upon separate ways 48 is a centering tool 49, or other axially movable tool at one end of a rotatable spindle, which may be slidably mounted in a small block 50 preferably slidably mounted on transverse ways on the head 13. Driving means for this tool preferably comprise a gear 52 splined to the tool spindle 49 which may be driven by a chain of gears 53 through the driving shaft 54 for the rotating chucks 24. By means of a hand lever 56 this centering tool 49 may be advanced axially with the sleeve in which it is rotatably mounted.

In order that the centering tool 49 and the head 50 in which it is mounted may be displaced during the operation of the cutting-off tools, I provide a special guideway 58 upon which the centering tool head 50 may be moved to displace the centering tool 49 and head 50 laterally. To move these members conveniently, I provide a lever 60 fastened at one end to the main head 13 and having a handle at its opposite end. At an intermediate point of the lever 60 a connecting link 61 is attached, the opposite end of which is attached to the centering tool head 50. By moving the lever 60 the connecting link is oscillated thus moving the centering tool head 50 in either direction transversely of the axis of rotation of the work blank. To limit the movement of this tool when moved toward its operative position, an adjusting screw 63 is mounted in the main tool head 13 adapted to be engaged by the centering tool head when in operative position. It will thus be seen that when the centering tool carrying head 50 is moved to operative position by operation of the lever 60, the gears 53 are placed in mesh with their driving gear 64 on the shaft 54.

In order to rotate the rod 17 to advance or withdraw the heads 13 and 14 from opposite positions, I provide a driving shaft 70 which may be driven from the main source of power or in any other manner that may be desired.

As shown the driving shaft 70 for this mechanism is directly fastened to the main driving shaft 71 so as to be rotated thereby. This driving shaft 70 is preferably splined to the main driving shaft so that a small amount of endwise movement is possible. On the sleeve 72 surrounding this shaft 70 is a pinion 73 which is in engagement with an idler 74 which in turn is in engagement with a gear 75 on the actuating screw threaded rod 16 for reciprocating the heads 13 and 14. The sleeve 72 carrying the driving gear 73 is adapted to be placed in driving connection with the shaft by means of the friction clutch 76. By rotating the main driving shaft in either direction, the screw threaded shaft 17 may be reversed to move the heads 13 and 14 simultaneously in opposite directions.

Preferably and as shown the screw threaded shaft 17 is axially movable through a short distance. This is to permit both of the heads to come up solidly against fixed stops before the friction clutch starts to slip. Springs 77 housed within a bracket on opposite sides of the driving gear 75 return the shaft to its mid-position.

Adjustably mounted on the base 10 between the heads 13 and 14 are adjustable members 80 extending transversely of the bed and provided on their upper surfaces with adjustable supports 81 at the upper ends of which are carried rollers 82. These rollers 82 are adapted to support the work blank A while the heads 13 and 14 are separated and while these heads are moved to their operative or inoperative positions and the chucks 25 moved to operatively engage the blank A. Preferably and as shown, these adjustable members 80 are so mounted that they contact with the inner opposite faces of the heads 13 and 14 when the heads together with their respective mechanism are in exactly predetermined positions. By this means, I am enabled to quickly bring the heads 13 and 14 into operative position or until they abut against the transverse members at which time, the driving mechanism for the threaded rod 17 slips and prevents further movement of these heads.

For convenience in loading articles into operative position, I provide a pair of tracks 85 extending transversely of the base 10 preferably adjacent the adjustable supporting means just described. The work blanks A may then be rolled into position while the heads 13 and 14 are separated until the blank rests upon the two rollers 82 above described. With the work blank A in this position, it may be moved longitudinally if necessary after which the heads 13 and 14 may be moved together to operative position and the chucks 25 moved into driving relation with the blank.

It will be seen that I have provided a machine adapted to quickly and readily handle heavy work blanks, the ends of which must be exactly square and centered. I also provide means to permit the blanks to be readily moved in operative position relative to the cutting tools.

Also, as soon as the work blank, such as shown at A, is mounted in position and the heads 13 and 14 moved to operative position, the chucks 25 may be tightened and then rotated through driving shaft 54 and the gears 23 and 55. Preferably, the cutting-off or other tools mounted on the slides 30 are previously adjusted accurately to their correct positions so that as soon as the heads 13 and 14 are advanced to operative position into contact with the members 80, the tools are correctly disposed for the operation desired.

What I claim is:

1. A metal cutting machine comprising in combination, a base, heads movably mounted on said base, work rotating chucks on said heads, means to simultaneously move said heads toward or from each other, transversely extending tracks to guide work blanks into operative position, whereby a work blank may be advanced to operative position on the base and said heads advanced toward each other to engage said chucks with said blanks, and cutting off and centering tools mounted on and movable with said heads, said centering tools being movable transversely on said heads into and out of operative position.

2. A metal cutting machine comprising in combination, a base, heads movably mounted on said base, work rotating chucks on said heads, means to simultaneously move said heads toward or from each other, means to support work blanks in operative position while said heads are separated, whereby a work blank may be advanced to operative position on the base and said heads advanced toward each other to engage said chucks with said blank, and cutting off tools mounted on and movable with each of said heads, said tools being disposed in opposite relation to each other and simultaneously movable toward or from the axis of rotation of the work.

3. A metal cutting machine comprising in combination, a base, heads movably mounted on said base, work rotating chucks on said heads, means to simultaneously move said heads toward or from each other, means to support work blanks in operative position while said heads are separated, whereby a work blank may be advanced to operative position on the base, means to simultaneously move said heads toward each other to engage said chucks with said blank, fixed stops to limit the approaching movement of said heads, and cutting off tools on the heads, said tools being disposed in opposite relation to each other and simultaneously movable toward or from the axis of rotation of the work.

4. A metal cutting machine comprising in combination, a base, heads movably mounted on said base, work rotating chucks on said heads, means to simultaneously move said heads toward or from each other, means to support a blank in position to be engaged in operative position by said chucks while said heads are separated, means to limit the approaching movement of said heads, cutting off tools mounted on and movable with said heads, and a centering tool on each head movable transversely of said head into and out of operative position.

5. A metal cutting machine comprising in combination, a base, heads movably mounted on said base, work rotating chucks on said heads, screw threaded means to simultaneously move said heads toward or from each other, means to support a blank in position to be engaged in operative position by said chucks while said heads are separated, means to limit the approaching movement of said heads, cutting off tools mounted on and movable with said heads, and a centering tool on each head movable transversely of said head into and out of operative position.

6. A metal cutting machine comprising in combination, a base, heads movably mounted on said base, work rotating chucks on said heads, driving means to rotate said chucks, means operated by said driving means to simultaneously move said heads toward or from each other, means to support a blank in position to be engaged in operative position by said chucks while said heads are separated, cutting off tools mounted on and movable with said heads, and a centering tool on each head movable transversely of said head into and out of operative position.

7. A metal cutting machine comprising in combination, a base, heads movably mounted on said base, means to simultaneously move said heads toward or from each other, work rotating chucks on said heads, adjustable means to limit the movement of said heads toward or from each other, means to support a blank in position to be engaged in operative position by said chucks while said heads are separated, cutting off tools mounted on and movable with said heads, and a centering tool on each head movable transversely of said head into and out of operative position.

8. A metal cutting machine comprising in combination, a base, heads movably mounted on said base, work rotating chucks on said heads, means to simultaneously move said heads toward or from each other, means to support a blank in position to be engaged in operative position by said chucks while said heads are separated, cutting off tools mounted on and movable with each of said heads, centering tools on said heads movable into and out of axial alignment with said rotating chucks, and levers adapted respectively to move said centering tools into axial alignment with the work and also into engagement therewith.

In testimony whereof, I hereto affix my signature.

WILLIAM J. HAGMAN.